UNITED STATES PATENT OFFICE.

OTTO FRITZ REINHOLD, OF MAPLEWOOD, NEW JERSEY, ASSIGNOR, BY MESNE ASSIGNMENTS, TO FOSTER-REINHOLD LABORATORIES, OF NEWARK, NEW JERSEY, A CORPORATION OF NEW JERSEY.

COMPOSITION OF MATTER.

1,374,233.  Specification of Letters Patent.  Patented Apr. 12, 1921.

No Drawing.  Application filed April 15, 1919. Serial No. 290,119.

*To all whom it may concern:*

Be it known that I, OTTO FRITZ REINHOLD, a citizen of Germany, residing at Maplewood, in the State of New Jersey, have invented certain new and useful Improvements in Composition of Matter, of which the following is a specification.

This invention relates to a composition of matter adaptable by treatment, in association with other matter, or without, to many different uses and applications in commercial fields, of which the present application is intended to cover its use as a combined solder and flux for metals. As the description proceeds, it will be evident that while the composition of matter is an efficient and useful solder and flux for any similar or dissimilar metals, this specification will describe it in connection with the uniting of aluminum pieces.

It is further to be understood that while the term solder is used for convenience in suggesting the result obtained, when the composition is used in effecting the union of metals, this use is recognized as loose and perhaps technically incorrect, as the exact physico-chemical, chemical, electrochemical or thermochemical actions or reactions involved in the union, or resulting from the contact or affinity of the composition with a metal or metal salts, whether aluminum or any other metals, are not known at this time.

The difficulties involved in the uniting or joining together of aluminum or aluminum alloys or aluminum with other metals in such a way that there is obtained a non-corrosive joint free from retroactive electrolytic action have long been recognized, and many attempts have been made to provide a solder, which would stand the test of use and while many claims have been made for more or less known compositions of aluminum solders, it is a fact that, today, the full development of aluminum is checked by the lack of a solder or means for uniting or joining together other metals or aluminum or aluminum with other metals, which is noncorrosive and free from retroactive electrolytic action after the joint is effected. My invention consists in the discovery of a composition of matter made up of a metallic salt and an amido-substitution-compound of meta-carbonic acid.

Of these compounds urea is one which may be used.

One part of sodium chlorid, a relatively small quantity of urea and four parts of zinc chlorid are heated until fused. I have found it desirable to prepare the sodium chlorid and the urea by thorough mixing before the zinc chlorid is added and the mixture subjected to heat.

When fused, the new composition of matter may be molded, granulated, or placed in any desired form for use. By way of experiments, I have established the fact that although sodium chlorid fused with certain other metallic chlorids will solder metals, the joint secured with this mixture is not one which is properly metallized and an excessive quantity of the mixture is wasted during the soldering operation. The new composition of matter, by reason of the presence of urea, when applied to pieces of aluminum or any metals to be united, in the presence of heat dissolves the aluminum or other oxid film and effects a union of the parts.

What the exact chemical character of the joint is, I am not prepared to say. But that there is a powerful reduction and uniting action is certain as the composition acts voluntarily in the sense that no mechanical agitation or directing thereof, as by a soldering iron, is required. It quickly works its way through the line of contact of the two pieces of metal and as quickly effects the union thereof. The united pieces may then be cooled and cleaned immediately in a hot or cold bath leaving a clean joint. This joint will not corrode or disintegrate even in the case of aluminum joining, under vibration, moisture, or other usual conditions of use.

While there has been described herein the use of sodium chlorid and zinc chlorid with an amido-substitution-compound, I do not limit myself to the salts mentioned nor to the proportions thereof. Any of the halogen salts may prove to be effective, when substituted in the composition and still other forms of metallic salts may be tried without departing from the spirit of the invention, which resides, broadly, in the discovery of the peculiar action of these salts in the presence of nitrogen or carbon or both, as is found when these salts are combined with one of the compounds of the cyanogen group. Within this generic group fall the amido-substitution-compounds of which one has been described herein.

Further, while I have suggested the use of urea, in this composition, I appreciate that urea has many derivatives, termed, alkylated ureas and ureids, which I also mean to include within my claims.

I will again emphasize that my discovery has led me to the development of many applications of my invention and so other uses than as a solder may suggest themselves to those skilled in the art, but all these uses are, of course, within the scope of this invention.

In the appended claims I have first set out with breadth the group in which I believe will be found the equivalent compounds of the one herein described. The amido-substitution-compounds constitute a species of the cyanogen compounds. There is described herein specifically the composition which thus far has proved satisfactory and the specific claims have therefore been addressed to this composition without, however, limiting the scope of the broader claims within which will fall the equivalents. It is to be understood that starting with my discovery of the peculiar value of one of the cyanogen compounds in a soldering composition, a skilled chemist may try other compounds than urea falling within this same group and thereby obtain the same or equivalent results.

What I claim is:

1. A composition of matter comprising metallic salts and an amido-substitution-compound of meta-carbonic acid.
2. A composition of matter comprising a metallic salt and an amido-substitution compound of meta-carbonic acid.
3. A composition of matter comprising a metallic salt and urea.
4. A composition of matter comprising a metallic salt and a derivative of urea.
5. A composition of matter comprising a metallic halogen salt and an amido-substitution-compound of meta-carbonic acid.
6. A composition of matter comprising a plurality of metallic chlorids and urea or its derivatives.
7. A composition of matter comprising sodium chlorid, zinc chlorid, and an amido-substitution-compound of meta-carbonic acid.
8. A composition of matter including zinc chlorid and an amido-substitution-compound of meta-carbonic acid.
9. A composition of matter including sodium chlorid and an amido-substitution-compound of meta-carbonic acid.
10. A composition of matter including sodium chlorid and urea.
11. A composition of matter including zinc chlorid and urea.
12. A composition of matter comprising approximately four parts zinc chlorid, one part sodium chlorid and a small quantity of urea.

This specification signed this 14th day of April, 1919.

OTTO FRITZ REINHOLD.